United States Patent Office 3,687,811
Patented Aug. 29, 1972

3,687,811
MICROBIOLOGICAL REDUCTION OF 15-KETO PROSTAGLANDIN DERIVATIVES
Frank B. Colton, Evanston, William J. Marsheck, Arlington Heights, and Masateru Miyano, Morton Grove, Ill., assignors to G. D. Searle & Co., Chicago, Ill.
No Drawing. Filed Dec. 18, 1970, Ser. No. 99,655
Int. Cl. C12d *1/02*
U.S. Cl. 195—30                                    11 Claims

ABSTRACT OF THE DISCLOSURE

Selective reduction of the 15-keto group of 9,15-diketo prostaglandin derivatives is achieved by fermentation with a bacterium of the genera Arthrobacter, Pseudomonas, Nocardia, Corynebacterium, Mycobacterium or Flavobacterium or with a yeast belonging to the class consisting of Rhodotorula and Saccharomyces. The resulting 9-keto-15-hydroxy compounds display useful pharmacological properties, e.g. anti-ulcerogenic, hypotensive and smooth muscle stimulating properties.

---

The present invention is concerned with a novel process whereby the 15-keto group of 9,15-diketo prostaglandin derivatives is selectively reduced by the fermentative action of a suitable microorganism or by the enzymes isolated therefrom, thus affording the corresponding 9-keto-15-hydroxy compounds. The latter compounds are useful pharmacological agents as is illustrated by their anti-ulcerogenic, hypotensive and smooth muscle stimulating properties.

In the instant process, there is utilized a bacterium selected from the genera consisting of Arthrobacter, Pseudomonas, Flavobacterium, Nocardia, Corynebacterium and Mycobacterium or a yeast belonging to the class consisting of Rhodotorula and Saccharomyces.

The selective reduction achieved by the instant process is most surprising and unexpected. A particularly surprising aspect of this invention is the fact that an asymmetric synthesis can be achieved by use of one of the aforementioned bacteria. It has thus been found that only one of the enantiomers of the 9,15-diketo substrate is affected when contacted with a bacterium of the genera Arthrobacter, Pseudomonas or Flavobacterium.

Specific microorganisms particularly suitable for use in the process of this invention are Arthrobacter sp. NRRL B–3873, Flavobacterium sp. NRRL B–3874, Pseudomonas sp. NRRL B–3875 and Rhodotorula glutinis NRRL Y–842.

9,15-diketo substrates which may be converted by the instant process are exemplified by 11-hydroxy-9,15-dioxoprosta-8(12),13-dienoic acid,
11-hydroxy-9,15-dioxoprost-13-enoic acid,
11-hydroxy-9,15-dioxoprost-8(12)-enoic acid,
9,15-dioxoprosta-8(12),13-dienoic acid and
9,15-dioxoprost-8(12)-enoic acid together with the corresponding lower alkyl carboxylate esters.

The foregoing lower alkyl term comprehends the groups exemplified by methyl, ethyl, propyl, butyl, pentyl, hexyl, heptyl and the corresponding branched-chain isomers.

The foregoing substrates are conveniently obtained by a process which involves the reaction of a suitably substituted cyclopentenyl aldehyde with hexanoylmethylene triphenyl phosphorane in the presence of a basic catalyst such as triethylamine. A specific example is the reaction of 2 - formyl-3-hydroxy-5-oxocyclopent-1-eneheptanoic acid with hexanoylmethylene triphenyl phosphorane, thus affording 11-hydroxy - 9,15 - dioxoprosta-8(12),13-dienoic acid. Preparation of the necessary aldehydes is exemplified by the method used for the aforementioned 2 - formyl-3-hydroxy-5-oxocyclopent-1-eneheptanoic acid, i.e. selenous acid oxidation of 4-phenyl-3-buten-2-one to afford styrylglyoxal, condensation of that aldehyde with 3-oxoundecane-1,11-dioic acid, cyclization of the resulting 14-phenyl-9,12-dioxo-11-hydroxytetradec - 13 - enoic acid, hydroxylation with osmium tetroxide of the 3-hydroxy-5-oxo-2-styrylcyclopent-1-eneheptanoic acid so produced and cleavage of the resulting glycol with sodium periodate.

As disclosed hereinbefore, the instant process not only provides a method for selectively reducing the 15-keto group of a 9,15-diketo prostaglandin but also, in the case of the bacteria mentioned, results in the selective conversion of one of the enantiomers of the racemic compound. *dl*-trans - 11 - hydroxy-9,15-dioxoprosta-8(12),13-dienoic acid, for example, is thus converted to *d*-trans-11,15-dihydroxy-9-oxoprosta-8(12),13-dienoic acid by the action of Pseudomonas sp. NRRL B–3875 and to *l*-trans-11,15-dihydroxy - 9 - oxoprosta-8(12),13-dienoic acid by the action of either Arthrobacter sp. NRRL B–3873 or Flavobacterium sp. NRRL B–3874. The yeast *Rhodotorula glutinis*, on the other hand, converts the same substrate to trans-11,15-dihydroxy-9-oxoprosta-8(12),13 - dienoic acid.

In the practice of this invention, the conversion may be effected in the growing culture of the microorganism either by adding the substrate to the culture during the incubation period or by including it in the nutrient medium prior to inoculation. Assimilable sources of carbon and nitrogen should be present in the culture medium. An adequate sterile air supply should be maintained during the conversion, for example, by the conventional techniques either of exposing a large surface of the medium to the sterile air or by passing air through a submerged culture.

Sources of nitrogenous growth-promoting factors are those normally employed in such processes. They may be natural organic materials such as soybean meal, corn steep liquor, meat extracts, peptone and/or distiller's solubles or synthetics such as nitrates and ammonium compounds.

Suitable energy source materials which may be utilized in the process of this invention include meat extracts, peptone, and the like, which serve also as nitrogen sources, or other conventional carbon-containing materials such as carbohydrates of the type exemplified by glycerol, glucose, fructose, dextrose, sucrose, lactose, maltose, dextrins, starches and whey. These materials may be used either in purified states or as concentrates, such as whey concentrate, corn steep liquor, grain mashes, and the like, or as mixtures of the above. The preferred but not limiting range of concentration of the substrate in the culture is about 0.1–1.0%. The time interval required for action of the enzyme system of the microorganisms employed may vary considerably, the range of 12–120 hours being practical but not limiting. The process of the present invention may be conducted at temperatures of 15–35°, the range of 25–30° being particularly preferred. It has been determined that the substate can be added to the reaction medium either in the solid form or dissolved in a suitable organic solvent such as acetone or methyl Cellosolve. The substrate can be added also as a finely divided solid. In such case, the finely divided substrate is added as an aqueous suspension containing a sufficient quantity of wetting agent suitable for dispersion of that material. Suitable wetting agents are exemplified by polyoxyethylene sorbtan monoesters such as polyoxyethylene sorbitan monooleate. Alternate methods using ultrasonic energy together with organic solvents can be used to provide finely divided substrates.

The anti-ulcerogenic property of the instant compounds is demonstrated by their ability to inhibit the ulceration reported by Shay et al., Gastroenterology, 5, 43 (1945), to occur in rats subjected to fasting and pyloric ligation. In this tests, male Charles River rats weighing 200–250 g. and fasted 72 hours prior to ligation are used. Immediately following ligation, the prescribed dose of compound, dissolved or suspended in 1.0 ml. of pH 2.0 hydrochloric acid is intragastically administered to each of a group of six animals. An initial dose of 50 mg. per kg. of body weight is normally employed. A like group of animals to which is identically and concurrently administered the acid alone serves as control. Precisely 19 hours later the stomachs of surviving animals are excised and examined under $5\times$ magnification. The number of ulcers occurring in a non-secretory portion of each stomach is counted in four groups according to size, i.e. less than 2 mm., 2–4 mm., 4–8 mm. and greater than 8 mm. Each rat is then assigned a score, z, which is a weighted average of the logarithms of the ulcer counts in several size groups determined by a formula found approximately optimal by discriminant function analysis to be as follows:

$$z = 20.00 \log (N_1+1) + 0.22 \log (N_2+1) + 46.76 \log (N_3+1) + 6.11 \log (N_4+1)$$

wherein $N_1 \ldots N_4$ are the observed ulcer counts of the increasing size groups. Since long term studies in approximately 400 animals show that the average $z$ value for controls is 96.2, with a standard error per group of 6 equal to 18.97, a decrease in the average $z$ score for a given test group, relative to concurrent controls, amounting to 37.5 or more is significant ($P \leq 0.05$); and a compound producing such a decrease is considered anti-ulcerogenic.

For the determination of hypotensive activity the following assay is used:

Male Charles River rats weighing 100–350 g. are anesthetized by intraperitoneal injection of 1.5 g./kg. of urethane, whereupon cardiovascular reflexes are blocked by subcutaneous injection of 3 mg. of atropine sulfate dissolved in 0.3 ml. of aqueous 0.85% sodium chloride and sensitization is induced by subcutaneous injection of 5 mg. of pentolinium tartrate dissolved in 1 ml. of aqueous 0.85% sodium chloride. The trachea is intubated and both femoral veins and a carotid artery are cannulated, the latter being connected to a calibrated transducer, amplifier and recorder. After surgery, 5 mg./kg. of heparin sodium is introduced via one of the venus cannulae as a 2% solution in aqueous 0.85% sodium chloride and rectal temperature is adjusted to 35° C. by means of a regulator and external heat source. When the animal's blood pressure and temperature have stabilized, a high and a low dose, with a ratio of high dose to low dose of 2:1, of the test compound and a high and a low dose, also in the ratio of 2:1, of the standard prostaglandin $E_2$ are individually administered intravenously and in a random pattern and the blood pressure measured after each injection. The blood pressure of each animal is permitted to return to normal between successive injections. The relative potency of the test compound compared to the standard prostaglandin $E_2$ is determined by a 4 point bioassay using a randomized block design. The results are analyzed by the method of C. I. Bliss, The Statistics of Bioassay, Academic Press, New York (1952).

The smooth muscle stimulating property of the compounds of this invention is demonstrated by their activity in each of the following three assays:

A segment of one of the uterine horns of a freshly killed rat is removed after determining that the rat is in the diestrus phase of the ovarian cycle by microscopic examination of a vaginal washing. The segment is mounted in a 2 ml. tissue bath containing de Jalon solution maintained at 37° C. and bubbled with a gaseous mixture of 95% oxygen and 5% carbon dioxide. Longitudinal contractions of the tissue elicited by 1 mcg./ml. and 2 mcg./ml. of the test compound are measured isotonically and compared to those elicited by 0.1 mcg./ml. and 0.2 mcg./ml. of a standard preparation of prostaglandin $E_2$. The relative potency of the test compound compared to the standard prostaglandin preparation is determined by a 4 point biossay using a randomized block design. Results are analyzed by the aforementioned method of Bliss.

In the second assay, a segment of duodenum from a freshly killed rabbit is mounted in a 4 ml. tissue bath containing Tyrode solution maintained at 37° C., through which is bubbled a gaseous mixture of 95% oxygen and 5% carbon dioxide. Longitudinal contractions of the tissue educed by 0.625 mcg./ml. and 1.25 mcg./ml. of the test compound are measured isotonically and compared to those educed by 0.025 mcg./ml. and 0.05 mcg./ml. of a standard preparation of prostaglandin $E_2$. The relative potency of the test compound compared to that of the standard is determined by a 4 point bioassay using a randomized block design and results are analyzed by the aforementioned method of Bliss.

In the third assay, a segment of distal ileum from a freshly killed guinea pig is mounted in a 2 ml. tissue bath containing modified Tyrode solution with ½ of the usual concentration of magnesium ions. The temperature is maintained at 37° C. and the solution is bubbled with a gaseous mixture of 95% oxygen and 5% carbon dioxide. Longitudinal contraction of the tissue elicited by 5 mcg./ml. and 10 mcg./ml. of the test compound are measured isotonically and compared to those elicited by 0.05 mcg./ml. and 0.1 mcg./ml. of a standard preparation of prostaglandin $E_2$. The relative potency of the test compound is determined by the procedure of Bliss described above.

The invention will appear more fully from the examples which follow. These examples are given by way of illustration only and are not to be construed as limiting the invention either in spirit or in scope since it will be apparent to those skilled in the art that many modifications both in materials and methods may be practiced without departing from the purpose or intent of this disclosure. Throughout these examples, temperatures are given in degrees centigrade (° C.) and relative amounts of materials in parts by weight except as otherwise noted.

EXAMPLE 1

A solution containing 100 parts of 4-phenyl-3-buten-2-one, 106 parts of selenous acid, 160 parts of dioxane and 20 parts of water is heated to the reflux temperature. After the initial vigorous reaction has subsided, the mixture is heated at that temperature for an additional 30 minutes. The supernatant is then decanted from the metallic selenium and is concentrated under reduced pressure. Distillation of the residue under reduced pressure affords styrylglyoxal, boiling at about 120° at 2.5 mm. pressure.

EXAMPLE 2

A solution of 38.2 parts of dimethyl 3-oxoundecane-1,11-dioate in 200 parts by volume of 10% aqueous potassium hydroxide is stored at 0–5° for about 3 days, then is adjusted to pH 5 by the addition of concentrated aqueous citric acid. To that mixture is added a solution which is prepared by heating 21.9 parts of styrylglyoxal in 50 parts by volume of 50% aqueous methanol at 65–75° for about 20 minutes, then adding 60 parts of methanol. To the resulting reacting mixture is added 30 parts by volume of 1 M pH 4.5–5.0 citrate buffer and stirring at room temperature is continued for about 3 hours, during which time carbon dioxide gas is evolved. The precipitated product is collected by filtration, thus affording the half potassium salt of 14-phenyl-9,12-dioxo-11-hydroxytetradec-13-enoic acid, melting at about 105°. Further purification by recrystallization from methanol affords the pure compound, melting at about 107.5°.

The latter half potassium salt is dissolved in water and the resulting aqueous solution is acidified by the addition of dilute hydrochloric acid. The resulting acidic mixture is extracted with ether and the ether layer is separated, washed with water, dried over anhydrous sodium sulfate and concentrated to dryness. The resulting solid residue is purified by recrystallization from chloroform-ether to yield 14 - phenyl - 9,12 - dioxo - 11 - hydroxytetradec-13-enoic acid, melting at about 81.5–83°.

EXAMPLE 3

To 3000 parts by volume of an aqueous solution containing 6.7 parts of potassium hydroxide is added, with stirring at about 21–23° over a period of about 2¼ hours, a solution of 10.4 parts of 14-phenyl-9,12-dioxo-11-hydroxytetradec-13-enoic acid in 187 parts of chloroform. After completion of the addition, the reaction mixture is stirred for an additional 2 hours, then is made acidic by adding 10 parts of oxalic acid dihydrate. The acidic mixture is extracted with chloroform and the organic layer is washed wtih dilute aqueous sodium chloride, then dried over anhydrous sodium sulfate and concentrated to dryness under reduced pressure. The resulting residue is recrystallized first from benzene, then from chloroform-ether to yield 3-hydroxy-5-oxo-2-styrylcyclopent-1-eneheptanoic acid, which displays a melting point at about 118°. This compound exhibits an ultraviolet absorption maximum at about 325 millimicrons with a molecular extinction coefficient of about 36,400.

EXAMPLE 4

A mixture consisting of 13 parts of 3-hydroxy-5-oxo-2-styrylcyclopent-1-eneheptanoic acid, 17.8 parts of sodium periodate, 55 parts of water, 160 parts of dioxane and 2 parts of a 2% osmium tetroxide in dioxane solution is stirred under nitrogen at room temperature for about 4 hours. The reaction mixture is then extracted with ether and the ether layer is separated and extracted several times with 0.5% aqueous sodium chloride. The salt extracts are saturated with sodium chloride, then extracted with ether. The ether layer is separated, dried over anhydrous sodium sulfate, then concentrated under reduced pressure to afford 2-formyl-3-hydroxy-5-oxocyclopent-1-eneheptanoic acid, characterized by an ultraviolet absorption maximum at about 228 millimicrons with a molecular extinction coefficient of about 10,100.

EXAMPLE 5

To a solution of 10.2 parts of 2-formyl-3-hydroxy-5-oxocyclopent-1-eneheptanoic acid in 200 parts of dioxane is added 4 parts of triethylamine and the resulting mixture is stripped of excess triethylamine by distillation under reduced pressure. The resulting residue is dissolved in 210 parts of dioxane. To that dioxane solution is then added 15.3 parts of hexanoylmethylene triphenyl phosphorane dissolved in 396 parts of benzene. The resulting reaction mixture is heated at the reflux temperature under nitrogen for about 18 hours, then is cooled, washed with aqueous oxalic acid and extracted with aqueous potassium bicarbonate. That alkaline extract is washed with ether, then acidified with oxalic acid and extracted with ether. The ether extract is washed with aqueous sodium chloride, dried over anhydrous sodium sulfate and concentrated to dryness under reduced pressure to afford the crude product, which is purified by dry column chromatography on silica gel containing 8% of water, using 4% methanol in benzene, or by chromatography on silica gel and elution with 40% ethyl acetate in benzene, thus affording 11-hydroxy-9,15-dioxoprosta-8(12),13-dienoic acid, characterized by an ultraviolet absorption maximum at about 291 millimicrons with a molecular extinction coefficient of about 21,900.

EXAMPLE 6

A medium consisting of 24 parts of commercial meat peptone, 3 parts of yeast extract, 30 parts of glucose, 7.5 parts of sodium chloride and 3,000 parts of distilled water is divided into ten 300-part portions. Each portion is sterilized by heating at approximately 120° at 15 pounds per square inch pressure for about 20 minutes, then is cooled to room temperature and inoculated with a culture of Pseudomonas sp. NRRL B–3875. The resulting fermentation mixtures are incubated with moderate aeration and agitation for about 24 hours at room temperature. At the end of that time there is added to each of the mixtures a solution of 0.2 part of 11-hydroxy-9,15-dioxoprosta-8(12),13-dienoic acid in 1 part of acetone. That fermentation reaction is continued for about 72 hours, at the end of which time the pH of each mixture is adjusted to approximately 4.0 by the addition of citric acid. The crude product is isolated from each mixture by extraction with methylene chloride. The combined extracts are concentrated to dryness under reduced pressure and the resulting residue is purified by partition chromatography on silicic acid. The solvents are prepared by shaking together 1500 parts by volume of benzene, 500 parts by volume of methanol and 200 parts by volume of water. The lower phase of that system is used as the stationary solvent and the upper phase as the eluting solvent. Elution of the column in that manner affords dextrorotatory trans-11,15-dihydroxy-9-oxoprosta-8(12),13-dienoic acid. This compound is characterized by an optical rotation of +26.24° in methanol and an ultraviolet absorption maximum at about 276.5 millimicrons with a molecular extinction coefficient of about 22,000.

EXAMPLE 7

A medium containing 24 parts of commercial meat peptone, 3 parts of yeast extract, 30 parts of glucose, 7.5 parts of sodium chloride and 3,000 parts of distilled water is divided into ten equal portions and each mixture is sterilized by heating at 120° and 15 pounds per square inch pressure for about 20 minutes. After cooling to room temperature, each mixture is inoculated with a culture of Pseudomonas sp. NRRL B–3875. Incubation is then carried out with moderate aeration and agitation for approximately 24 hours at room temperature. At the end of that time, there is added to each of the mixtures a solution of 0.2 part of 11-hydroxy-9,15-dioxoprosta-8(12),13-dienoic acid dissolved in 1 part of acetone. The fermentation is continued for about 24 hours longer, at the end of which time the pH is adjusted to approximately 4.0 by the addition of citric acid and that mixture is extracted with methylene chloride. The combined organic extracts are concentrated to dryness and the resulting residue is purified by partition chromatography on a silicic acid column. The stationary phase consists of the lower layer of a mixture obtained by shaking together 1500 parts by volume of benzene, 500 parts by volume of methanol and 200 parts by volume of water. Elution of the column with the upper phase of that mixture affords dextrorotatory trans-11,15-dihydroxy - 9 - oxoprosta-8(12),13-dienoic acid, identical with the product of Example 6.

EXAMPLE 8

A medium consisting of 51 parts of commercial pancreatic digest of casein, 9 parts of soy peptone, 7.5 parts of glucose, 15 parts of sodium chloride and 3000 parts of distilled water is divided into ten equal portions and each portion is sterilized by heating at 120° at 15 pounds per square inch pressure for about 20 minutes. Each of the mixtures is then inoculated with a culture of Arthrobacter sp. NRRL B-3873 and the resulting mixture is incubated with agitation for about 24 hours at room temperature. To each of the mixtures is then added a solution containing 0.2 part of 11-hydroxy-9,15-dioxoprosta-8(12),13-dienoic acid dissolved in 1 part of acetone. The fermentation is continued for approximately 42 hours, at the end of which time the pH is adjusted to 4.0 by the addition of citric acid and that acidic solution is extracted with methylene chloride. The organic extracts are combined and concentrated to dryness under reduced pressure. The resulting residue is purified by partition chromatography on a silicic acid column, using as the stationary phase the lower layer obtained by shaking together a mixture of 1500 parts by volume of benzene, 500 parts by volume of methanol and 200 parts by volume of water. Utilization of the upper layer of that mixture as the eluting solvent affords levorotatory trans-11,15-dihydroxy-9-oxoprosta-8(12),13-dienoic acid, characterized by an optical rotation, in methanol, of −32.1° and an ultraviolet absorption maximum at about 276 millimicrons with a molecular extinction coefficient of approximately 26,700.

EXAMPLE 9

A medium containing 51 parts of commercial pancreatic digest of casein, 9 parts of soy peptone, 7.5 parts of glucose, 15 parts of sodium chloride and 3000 parts of distilled water is divided into ten equal portions and each of the portions is sterilized by heating at 120° at 15 pounds per square inch pressure for about 20 minutes, then is cooled to room temperature and inoculated with a culture of Flavobacterium sp. NRRL B-3874. Each of the mixtures is incubated with agitation for approximately 24 hours at room temperature and a solution containing 0.2 part of 11 - hydroxy - 9,15-dioxoprosta-8(12),13-dienoic acid in 1 part of acetone is added. The fermentation reaction is continued for about 42 hours. At the end of that time, the pH is adjusted to approximately 4.0 by the addition of citric acid and each mixture is extracted with methylene chloride. The methylene chloride extracts are concentrated to dryness under reduced pressure and the resulting combined residues are purified by partition chromatography on a silicic acid column. The lower layer obtained by mixing together 1500 parts by volume of benzene, 500 parts by volume of methanol and 200 parts by volume of water is used as the stationary phase and the upper layer of that mixture as the eluting solvent. Elution of the column in that manner affords levorotatory trans-11,15-dihydroxy-9-oxoprosta-8(12),13-dienoic acid, identical with the product of Example 8.

EXAMPLE 10

A medium consisting of 1500 parts of commercial enzyme digest of protein, 50 parts of glucose and 1500 parts of distilled water is divided into five equal portions and each portion is sterilized by heating at 120° for 20 minutes under 15 pounds per square inch pressure. After cooling to room temperature, each of the mixtures is inoculated with a culture of *Rhodotorula glutinis* NRRL Y-842, then is incubated with agitation at room temperature for approximately 72 hours. To each of the fermentation mixtures is then added a solution of 0.2 part of 11-hydroxy-9,15-dioxoprosta-8(12),13-dienoic acid in 1 part of acetone and the fermentation is allowed to continue for approximately 31 hours. The pH is then adjusted to about 4.0 by the addition of citric acid and the mixture is extracted with methylene chloride. The methylene chloride extracts are combined, then concentrated to dryness under reduced pressure. Purification of the resulting residue is achieved by partition chromatography on a silicic acid column, using, as the stationary phase, the lower layer of a mixture obtained by shaking together 1500 parts by volume of benzene, 500 parts by volume of methanol and 200 parts by volume of water. The upper layer of that system is utilized as the eluting solvent. Elution of the column in that manner affords trans-11,15-dihydroxy-9-oxoprosta - 8(12),13 - dienoic acid, characterized by an ultraviolet absorption maximum at about 276 millimicrons and a molecular extinction coefficient of about 26,500.

What is claimed is:

1. A process for the selective reduction of the 15-keto group of a 9,15-diketo prostaglandin which comprises subjecting a 9,15-diketo prostaglandin, in an aqueous nutrient medium, to the fermentative action of a microorganism selected from the group consisting of Pseudomonas, Arthrobacter, Flavobacterium and *Rhodotorula glutinis*, then isolating the 9-keto-15-hydroxy prostaglandin produced.

2. The process of claim 1, wherein the microorganism is selected from the group consisting of Pseudomonas sp. NRRL B-3875, Arthrobacter sp. NRRL B-3873, Flavobacterium sp. NRRL B-3874 and *Rhodotorula glutinis* sp. NRRL Y-842.

3. The process of claim 1, wherein the microorganism is selected from the group consisting of Pseudomonas sp. NRRL B-3875, Arthrobacter sp. NRRL B-3873, and Flavobacterium sp. NRRL B-3874 and the 9-keto-15-hydroxy prostaglandin produced is optically active.

4. The process of claim 1, wherein the 9,15-diketo prostaglandin is 11 - hydroxy-9,15-dioxoprosta-8(12),13-dienoic acid and the 9-keto-15-hydroxy prostaglandin produced is trans - 11,15 - dihydroxy-9-oxoprosta-8(12),13-dienoic acid.

5. The process of claim 1, wherein the microorganism is selected from the group consisting of Pseudomonas sp. NRRL B-3875, Arthrobacter sp. NRRL B-3873, Flavobacterium sp. NRRL B-3874 and *Rhodotorula glutinis* sp. NRRL Y-842, the 9,15-diketo prostaglandin is 11-hydroxy-9,15-dioxoprosta-8(12),13-dienoic acid and the 9-keto-15-hydroxy prostaglandin produced is trans-11,15-dihydroxy-9-oxoprosta-8(12),13-dienoic acid.

6. The process of claim 1, wherein the microorganism is selected from the group consisting of Pseudomonas sp. NRRL B-3875, Arthrobacter sp. NRRL B-3873 and Flavobacterium sp. NRRL B-3874, the 9,15-diketo prostaglandin is 11-hydroxy-9,15-dioxoprosta-8(12),13-dienoic acid and the 9-keto-15-hydroxy prostaglandin is an optically active trans-11,15-dihydroxy-9-oxoprosta-8(12),13-dienoic acid.

7. The process of claim 1, wherein the microorganism is *Rhodotorula glutinis* sp. NRRL Y-842, the 9,15-diketo prostaglandin is 11-hydroxy-9,15-dioxoprosta-8(12),13-dienoic acid and the 9-keto-15-hydroxy prostaglandin produced is trans-11,15-dihydroxy-9-oxoprosta-8(12),13-dienoic acid.

8. The process of claim 1, wherein the microorganism is selected from the group consisting of Arthrobacter sp. NRRL B-3873 and Flavobacterium sp. NRRL B-3874, the 9,15-diketo prostaglandin is 11-hydroxy-9,15-dioxoprosta-8(12),13-dienoic acid and the 9-keto-15-hydroxy prostaglandin produced is levorotatory trans-11,15-dihydroxy-9-oxoprosta-8(12),13-dienoic acid.

9. The process of claim 1, wherein the microorganism is Pseudomonas sp. NRRL B-3875, the 9,15 - diketo prostaglandin is 11 - hydroxy-9,15-dioxoprosta-8(12),13-dienoic acid and the 9-keto-15-hydroxy prostaglandin produced is dextrorotatory trans-11,15-dihydroxy-9-oxoprosta-8(12),13-dienoic acid.

10. The process of claim 1, wherein the microorganism is Arthrobacter sp. NRRL B-3873, the 9,15-diketo prostaglandin is 11-hypdroxy-9,15-dioxoprosta-8(12),13-dienoic acid and the 9-keto-15-hydroxy prostaglandin produced is levorotatory trans-11,15-dihydroxy-9-oxoprosta-8(12),13-dienoic acid.

11. The process of claim 1, wherein the microorganism is Flavobacterium sp. NRRL B-3874, the 9,15-diketo prostaglandin is 11-hydroxy-9,15-dioxoprosta-8(12),13-dienoic acid and the 9-keto-15-hydroxy prostaglandin produced is levorotatory trans - 11,15-dihydroxy-9-oxoprosta-8(12),13-dienoic acid.

References Cited

Muys et al.: App. Micro. vol. 11, p. 389–393, 1963.

LIONEL M. SHAPIRO, Primary Examiner

G. M. NATH, Assistant Examiner

U.S. Cl. X.R.

260—514